(12) United States Patent
Clarke

(10) Patent No.: US 9,943,985 B2
(45) Date of Patent: Apr. 17, 2018

(54) HEATING PREFORMS

(75) Inventor: Peter Reginald Clarke, West Sussex (GB)

(73) Assignee: GR8 ENGINEERING LIMITED, West Sussex (GB)

( * ) Notice: Subject to any disclaimer, the term of this patent is extended or adjusted under 35 U.S.C. 154(b) by 917 days.

(21) Appl. No.: 14/115,669

(22) PCT Filed: May 4, 2012

(86) PCT No.: PCT/EP2012/058268
§ 371 (c)(1),
(2), (4) Date: Feb. 13, 2014

(87) PCT Pub. No.: WO2012/150342
PCT Pub. Date: Nov. 8, 2012

(65) Prior Publication Data
US 2014/0346709 A1    Nov. 27, 2014

(30) Foreign Application Priority Data

May 5, 2011    (GB) .................................. 1107499.4

(51) Int. Cl.
| | | |
|---|---|---|
| *B29B 13/02* | (2006.01) | |
| *B29C 49/64* | (2006.01) | |
| *B29C 49/68* | (2006.01) | |

(52) U.S. Cl.
CPC ............ *B29B 13/02* (2013.01); *B29B 13/024* (2013.01); *B29C 49/64* (2013.01);
(Continued)

(58) Field of Classification Search
CPC . B29C 49/64; B29C 49/6409; B29C 49/6418; B29C 49/6436; B29C 49/6445;
(Continued)

(56) References Cited

U.S. PATENT DOCUMENTS 3,662,048 A * 5/1972 Turner ................ B29C 49/6436
                                                     264/327
3,775,524 A * 11/1973 Seefluth .............. B29C 49/6436
                                                     264/327
(Continued)

FOREIGN PATENT DOCUMENTS

| EP | 0849067 | 6/1998 |
|---|---|---|
| GB | 2474124 | 4/2011 |

(Continued)

*Primary Examiner* — Jeffrey Wollschlager
(74) *Attorney, Agent, or Firm* — Tarter Krinsky & Drogin LLP

(57) ABSTRACT

An apparatus for reheating and conditioning an elongate preform for forming a blow molded container, said apparatus comprising: a receiver including an elongate annular non-cylindrical inner surface portion, wherein the surface portion defines a cavity and is adapted to engage with an elongate outer surface of an elongate preform to transfer heat thereto by conduction from said surface portion, wherein the surface portion includes a three-dimensional relief to provide substantially non-uniform contact between the receiver and the elongate preform; and means for heating said receiver.

15 Claims, 5 Drawing Sheets

(52) U.S. Cl.
CPC .... B29C 49/6436 (2013.01); *B29B 2013/026* (2013.01); *B29B 2013/027* (2013.01); *B29B 2013/028* (2013.01); *B29C 49/6409* (2013.01); *B29C 49/6418* (2013.01); *B29C 49/6445* (2013.01); *B29C 49/6454* (2013.01); *B29C 49/6463* (2013.01); *B29C 49/6472* (2013.01); *B29C 49/68* (2013.01)

(58) Field of Classification Search
CPC ............ B29C 49/6454; B29C 49/6463; B29C 49/6472; B29C 49/68; B29B 13/024; B29B 13/02; B29B 2013/026; B29B 2013/027; B29B 2013/028
See application file for complete search history.

(56) References Cited

U.S. PATENT DOCUMENTS

| | | | | |
|---|---|---|---|---|
| 3,892,830 | A * | 7/1975 | Hudson | B29C 49/6436 264/327 |
| 4,207,063 | A * | 6/1980 | Sugita | B29C 49/68 219/388 |
| 4,233,022 | A * | 11/1980 | Brady | B29C 49/4823 215/373 |
| 4,380,526 | A * | 4/1983 | Agrawal | B29C 49/08 264/532 |
| 5,942,259 | A * | 8/1999 | Uchiyama | B29B 13/024 264/403 |
| 6,287,507 | B1 * | 9/2001 | Appel | B29C 49/6436 264/327 |
| 6,514,448 | B1 * | 2/2003 | Vogel | B29C 49/4205 264/346 |
| 8,501,078 | B2 * | 8/2013 | Meinzinger | B29C 49/4205 264/346 |
| 8,684,725 | B2 * | 4/2014 | Schmitt | B29C 49/6409 425/522 |
| 2005/0147712 | A1 * | 7/2005 | Pesavento | B29C 45/0053 425/533 |
| 2007/0163213 | A1 * | 7/2007 | Till | B29C 49/20 53/471 |
| 2010/0289178 | A1 * | 11/2010 | Stoiber | B29C 49/6436 264/235 |
| 2011/0135288 | A1 * | 6/2011 | Winzinger | B29B 13/024 392/416 |

FOREIGN PATENT DOCUMENTS

| | | |
|---|---|---|
| JP | 06238742 | 8/1994 |
| JP | 63207630 | 8/1998 |
| WO | 2011039295 | 4/2011 |

* cited by examiner

SECTION B-B

HEATING PREFORMS

The present invention relates to an apparatus and method for reheating and conditioning a preform, in particular an elongate preform for stretch blow moulding into a container such as a bottle.

In the packaging industry, the process of blow moulding is often used in the manufacture of containers, particularly bottles for carbonated beverages. This process involves the initial formation of a preform, typically by injection moulding, which preforms are subsequently blow moulded to form the containers. Such preforms are typically formed of thermoplastic material, particularly polyethylene terephthalate (PET).

PET preforms need to be at the correct temperature for stretch blow moulding when introduced into the mould cavity of a blow moulding machine. The desired temperature may vary along the length of the preform. To achieve this, there are currently four known methods:
1. Latent heat within the preform, the latent heat resulting from solidification of the preform during the injection moulding process;
2. Latent heat, together with additional radiated heat from a radiation heater;
3. Radiated heat; or
4. Microwave energy emitted from a source of microwave energy.

These known methods can suffer from one or more of the following problems, namely: the temperature control of various regions of the preform can be inaccurate, the energy consumption may be high, and the heated preform may be subjected to stresses causing deformation prior to blow moulding.

It is currently generally accepted within the blow moulding industry that any form of contact to the surface on the hot preform will have a detrimental effect on the stretch-blow phase, for example inadvertently introducing a temperature gradient within the preform and/or damaging the surface of the preform to introduce blow moulding irregularities or visible defects in the blow moulded container and/or causing off-axis blow moulding.

The Applicant's earlier GB-A-2474124 discloses a method of apparatus and method for reheating and conditioning a preform.

The present invention aims at least partially to provide an improvement to the apparatus and method disclosed in GB-A-2474124. Although that earlier apparatus and method overcame problems of earlier known heating methods and apparatus, there is still a need in the art for a method and apparatus for preform heating in which there is even further accurate temperature control, for example in which the neck area of the preform is not overheated, in which there is even further low energy consumption and in which the preform is allowed to relax without bending.

JP-A-63207630 discloses controlling thickness in the circumferential direction of a blow moulded bottle by shaping a preform by blowing the outer surface of the preform against the elliptical inner surface of a temperature control pot.

JP-A-06238742 discloses controlling thickness in a predetermined part of a blow moulded bottle by contacting only a predetermined part of a preform against an inner wall of a temperature control pot and heating or cooling only the contact part to provide a temperature distribution in the peripheral direction of the preform.

The present invention provides an apparatus for reheating and conditioning an elongate preform for forming a blow moulded container, said apparatus comprising:

a receiver including an elongate annular non-cylindrical inner surface portion, wherein the surface portion defines a cavity and is adapted to engage with an elongate outer surface of an elongate preform to transfer heat thereto by conduction from said surface portion, wherein the surface portion is rotationally continuous about an elongate axis and includes a three-dimensional relief to provide substantially non-uniform contact between the receiver and the elongate preform, the three-dimensional relief defining at least one longitudinally extending non-contact region extending between opposed upper and lower cylindrical surface portions located radially inwardly of the longitudinally extending non-contact region; and means for heating said receiver.

Optionally, the upper and lower surface portions are cylindrical.

Optionally, the elongate annular non-cylindrical inner surface portion provides the three-dimensional relief along a major portion of the length of the receiver.

Optionally, the three-dimensional relief defines two opposed longitudinally extending non-contact regions extending between opposed upper and lower surface portions located radially inwardly of the longitudinally extending non-contact regions.

Optionally, the three-dimensional relief provides a relief depth of from 0.01 to 1.5 mm, further optionally from 0.5 to 1.0 mm or from 0.3 to 0.7 mm.

Optionally, the three-dimensional relief is adapted to provide contact and non-contact areas between the elongate annular inner surface portion and a preform, for example the preform having a substantially cylindrical outer cross-section.

Optionally, the three-dimensional relief has raised parts and recessed parts.

Optionally, the contact areas are provided by raised parts of the three-dimensional relief and the non-contact areas are provided by recessed parts of the three-dimensional relief.

Shallower relief depths may have particular utility for wider recessed parts.

Optionally, the elongate annular inner surface portion is elliptical about an elongate axis.

Optionally, the elliptical elongate annular inner surface portion has a first major internal width which is larger than a second minor internal width.

Optionally, the first major internal width is from 1 to 3 mm, further optionally from 1 to 2 mm or from 0.6 to 1.4 mm larger than the second minor internal width.

Optionally, the receiver comprises a heater block for reheating and conditioning a preform therein and the cavity is disposed between split halves of the block, the split halves being separated by a longitudinal split extending between the halves.

Optionally, wherein the split halves of the block are movable by pivoting between an open position, at which upper ends of the split halves are separated with a gap therebetween, and a closed position, at which the upper ends of the split halves are urged together in contact.

The present invention further provides a method for reheating and conditioning an elongate preform for forming a blow moulded container, wherein said preform is formed from a thermoplastic material and has an outer surface, the method comprising the steps of:

i) discontinuously contacting the outer surface of the preform with a surface of a receiver, wherein the surface of the receiver includes an elongate annular non-cylindrical inner surface portion which is rotationally continuous about an elongate axis and provides a three-dimensional relief adapted to engage in substantially non-uniform contact with said outer surface of the preform, and said receiver is adapted to transfer heat conductively from said surface of the receiver to the preform;

ii) heating the receiver such that heat is transferred conductively from the receiver to the preform.

Optionally, the three-dimensional relief defines at least one longitudinally extending non-contact region extending between opposed upper and lower surface portions located radially inwardly of the longitudinally extending non-contact region.

Optionally, the three-dimensional relief defines two opposed longitudinally extending non-contact regions extending between opposed upper and lower surface portions located radially inwardly of the longitudinally extending non-contact region.

Optionally, the upper and lower surface portions are cylindrical.

Optionally, the elongate annular non-cylindrical inner surface portion provides the three-dimensional relief along a major portion of the length of the receiver.

Optionally, the three-dimensional relief provides a relief depth of from 0.01 to 1.5 mm, further optionally from 0.5 to 1.0 mm or from 0.3 to 0.7 mm.

Optionally, the elongate annular inner surface portion is elliptical about an elongate axis.

Optionally, the elliptical elongate annular inner surface portion has a first major internal width which is larger than a second minor internal width.

Optionally, the method is used in a method of blow moulding a bottle having an elliptical cross section.

Optionally, the first major internal width is from 1 to 3 mm, further optionally from 1 to 2 mm or from 0.6 to 1.4 mm larger than the second minor internal width.

Optionally, the three-dimensional relief is adapted to provide contact and non-contact areas between the elongate annular inner surface portion and the preform.

Optionally, the contact areas are provided by raised parts of the three-dimensional relief and the non-contact areas are provided by recessed parts of the three-dimensional relief.

Optionally, in the heating step the contact areas of the preform are heated to a temperature of from 5 to 15° C. higher, optionally from 6 to 10° C. higher, than the temperature to which the non-contact areas are heated.

Optionally, the receiver further comprises a second, substantially hemispherical concave inner surface portion coupled to the elongate annular inner surface portion.

Optionally, said surface of the receiver defines a cavity which has a closed upper end and an open lower end.

Optionally, the receiver comprises a heater block for reheating and conditioning a preform therein and the cavity is disposed between split halves of the block, the split halves being separated by a longitudinal split extending between the halves, and the split halves of the block are movable by pivoting between an open position, at which upper ends of the split halves are separated with a gap therebetween and the perform is inserted into or removed from the receiver, and a closed position, at which the upper ends of the split halves are urged together in contact and the preform is reheated and conditioned.

The present invention on predicated on the finding by the present inventor that excellent results can be obtained by using conductive heat to reheat and condition preforms, and that by providing a three-dimensional relief surface for partial contact of the preform outer surface, additional advantages can result. In particular, is has been found surprisingly that if the inside of the heating receiver is provided with such relief then the temperature of the heated preform could be controllably varied in a preferential manner.

For example, it was found that a relief depth of 0.7 mm caused a 7 to 8° C. drop in preform temperature, locally to the relieved area.

The relief can be sculptured to create any designated area to be cooler that the rest of the preform. This can be used for oval bottles, bottles with designed-in features such as ribs, cosmetic shapes, locally thickening bands or features within a round bottle.

One such sculpturing method is to create an ellipse within the heated receiver. This can create a small clearance near the front/back centre line of the preform and a greater clearance at the left/right centre line. This accordingly can cause the material to stretch first from the front/back centre line, stretching out the thick preform section to achieve an even panel thickness in the major axis of an oval bottle and prevent thinning down the minor axis sides.

The advantage of employing such a three-dimensional relief in the receiver is that the consequential preferential heating is constant and repeatable; once the receiver has been sculptured, it cannot vary. In contrast, if infrared radiant energy is used for heating the preform, the rotational speed in front of the heaters, temperature and time in the oven are critical parameters which may vary and consequently may cause the reheating to vary inadvertently.

By employing conduction heating, where the preform is in direct contact with its surrounding heated receiver in the form, for example, of a sleeve, has been found to use less than 50% of the energy required by infrared, or near infrared, radiation heating. By combining the provision of relief areas with the very low energy consumption of conduction heating, the inventor has found the lowest energy method to create stretch blow moulded bottles from conventional preforms.

The inventor has also found that that vacuum is not needed to hold the preform in the inverted receiver as slight swelling occurs within about 10 seconds of the preform entering the receiver, which swelling is sufficient to prevent the preform falling out of the receiver when in an inverted orientation.

It has also been found that if the surface temperature of the receiver is kept lower than the higher end of the thermoplastic material's reheat temperature range for blow moulding (i.e. softening point), the preform does not adhere to the receiver and therefore there is no detrimental effect, for example as discussed above with respect to the state of the art, on the stretch-blow phase of the container manufacturing process resulting from the direct thermally conductive contact between the receiver and the preform.

The present invention employs conductive heat to reheat and condition preforms. Particular benefits achievable by the preferred embodiments of the present invention are:

1. the preform is allowed to relax with its shape controlled, with no bending during stress relief;
2. "knife-edge" temperature change (i.e. a large temperature drop/increase can be controllably established over a short distance), with no overheating of the neck area, or a high temperature in the neck area to achieve a level of crystallinity for heat set applications;
3. very accurate temperature control due to surface contact of the receiver and preform; and/or 4. very low energy consumption due to direct heat transfer by conduction, enhanced by partial contact between the preform and the three-dimensional relief surface of the receiver.

Embodiments of the present invention will now be described by way of example only with reference to the accompanying drawings, in which.

Figure 4:
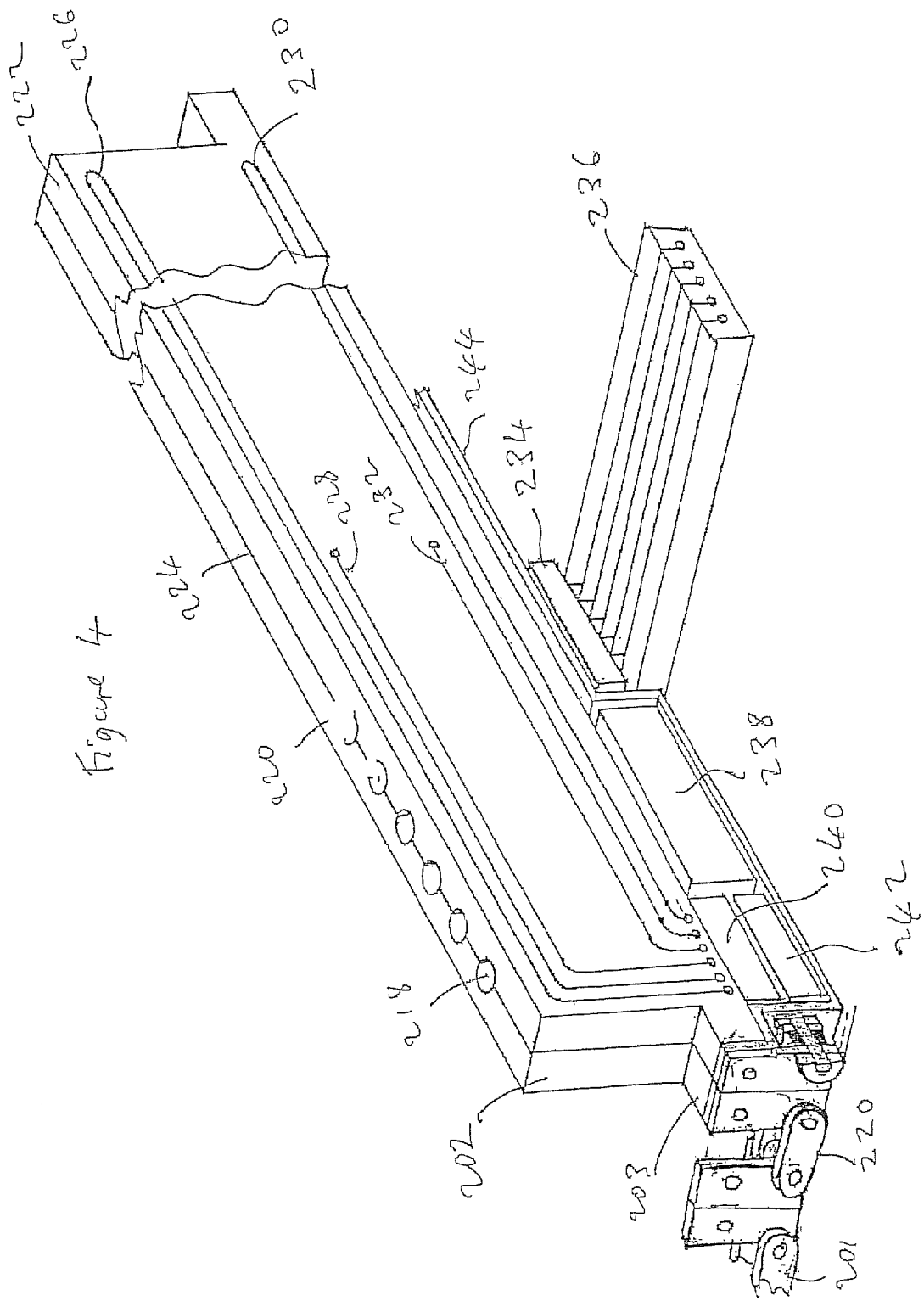
FIG. 4 shows a schematic perspective view of a heater block of the preform reheating and conditioning apparatus of FIG. 3.

FIGS. 5(a) and (b) show schematic perspective views of the heater block of FIG. 4 in an open position and a closed position respectively.

Figure 6:
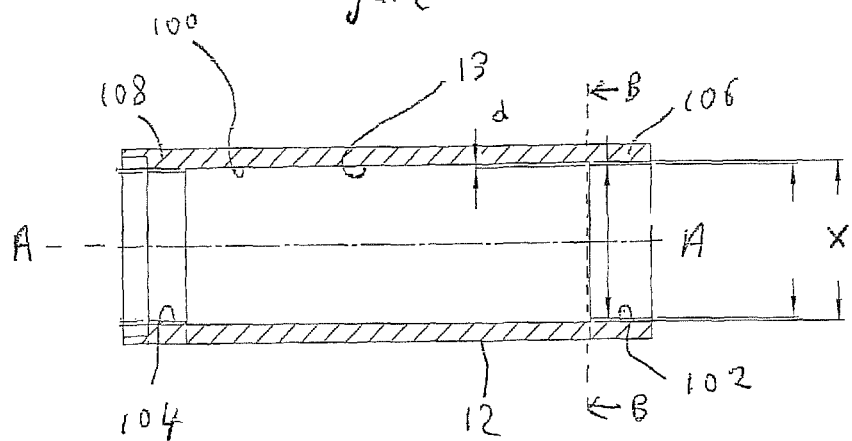

FIG. 6 is a longitudinal cross-section through a receiver portion having a three-dimensional relief in accordance with the invention.

Figure 7:
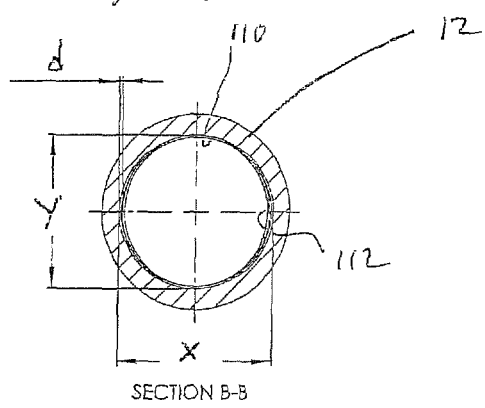

FIG. 7 is a transverse cross-section on line B-B through the receiver portion of FIG. 6.

Figure 1:
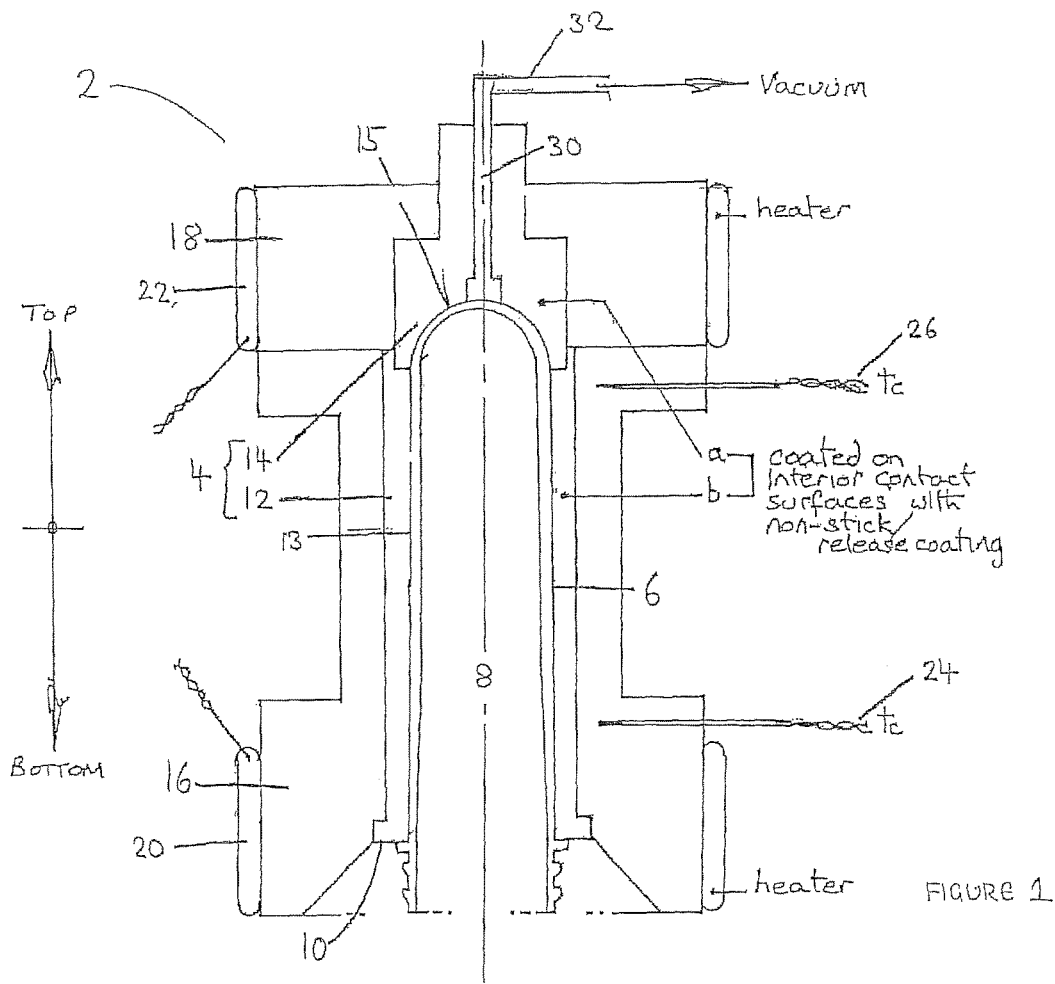
FIG. 1 shows a schematic cross-section through an apparatus for reheating and conditioning a preform in accordance with a first embodiment of the present invention.
Figure 2:
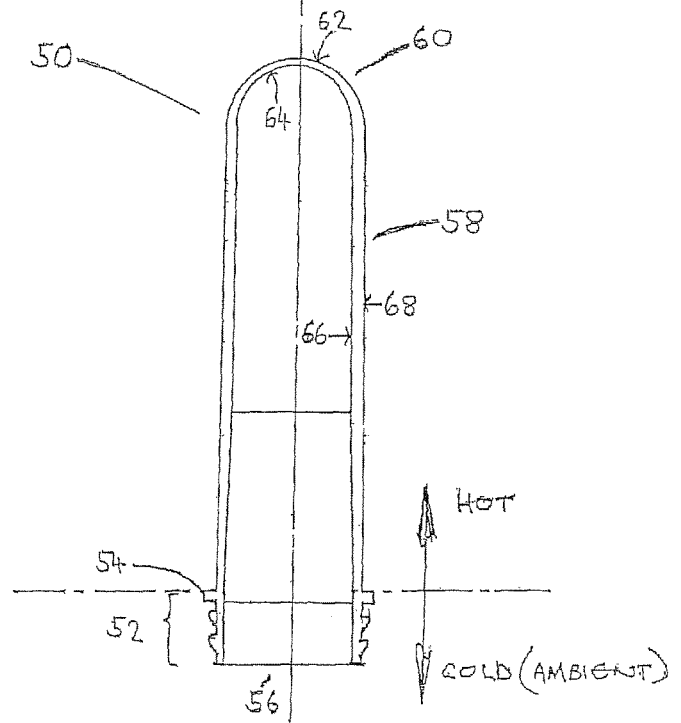
FIG. 2 is a schematic representation of the temperature distribution within different sections of a preform which is heated by the apparatus of the present invention.

Referring to FIGS. 1, 6 and 7 there is shown an apparatus 2, according to a first embodiment of the present invention, for reheating and conditioning an elongate preform 50. The preform 50 which is to be heated comprises a thermoplastic material, such as PET. The preform 50 has a conventional hollow structure and comprises a threaded neck finish 52, including an annular closure seating flange 54, at an open end 56 of the preform 50, a main body section 58 and a closed end 60 having a convex outer surface 62, and a corresponding concave inner surface 64, which are typically substantially hemispherical. The main body section 58 is substantially cylindrical, but with a small taper towards the closed end 60. The main body section 58 has an inner surface 66 and an outer surface 68.

The apparatus 2 comprises an elongate receiver 4 which has a preform-engaging surface 6 adapted substantially to mate with at least a portion of the complementary outer surface of the preform 50. The preform-engaging surface 6 defines a cavity 8 shaped and dimensioned to provide a non-uniformly close contact with the outer surfaces 62, 68 of the preform 50 located towards the closed end 60 with respect to the flange 54. The receiver 4 has an end face 10 against which the flange 54 can abut in use when the preform 50 is received in the cavity 8. During heating, the finish 52 of the preform 50 is not in contact with the preform-engaging surface 6, and remains outside the cavity 8.

The receiver 4 is composed of a main body 12, which surrounds a first elongate cavity portion and has an elongate annular non-cylindrical inner surface 13 which is shaped and dimensioned to receive the main body section 58 of the preform 50, and an end body 14, mating with the main body 12, which surrounds a second, substantially hemispherical, cavity portion and has a concave inner surface 15 which is shaped and dimensioned to receive the closed end 60 of the preform 50. The main body 12 and the end body 14 are respectively mounted within main and end blocks 16, 18 which abut. The preform-engaging surface 6 defining the cavity 8 is optionally coated with a non-stick material, which may be PTFE (polytetrafluoroethylene). Such a non-stick material may be omitted if low heating temperatures are used, typically less than 100° C. for polyethylene terephthalate (PET) preforms.

Referring in particular to FIGS. 6 and 7, the elongate annular non-cylindrical inner surface 13 of main body 12 includes a three-dimensional relief 100 to provide substantially non-uniform contact between the receiver 4 and the elongate preform 50. The three-dimensional relief 100 provides a relief depth, d, in this embodiment of from 0.5 to 1.5 mm, further optionally from 0.5 to 1.0 mm, still further optionally from 0.6 to 0.8 mm. However, smaller or larger relief depths may be employed, and shallower relief depths may be employed for wider relief areas. In this embodiment, the elongate annular inner surface 13 is elliptical about an elongate axis A-A. The elliptical elongate annular inner surface 13 has a first major internal width X which is larger than a second minor internal width Y. In this embodiment, the first major internal width X is from 1 to 3 mm, optionally from 1 to 2 mm, further optionally from 1.2 to 1.6 mm, larger than the second minor internal width Y.

The main body 12 may further include a respective cylindrical inner surface portion 102, 104 and the neck and base ends 106, 108 of the elongate annular non-cylindrical inner surface 13. The cylindrical inner surface portions 102, 104 are located very slightly radially inwardly of the elliptical elongate annular inner surface 13.

The elongate annular non-cylindrical inner surface 13 of main body 12 is typically provided with a taper of progressively reducing internal dimensions along its length from the neck end 106 to the base end 108.

A first annular heater 20 surrounds the main block 16 and a second annular heater 22 surrounds the end block 18. The first and second heaters 16, 18 are spaced from each other in a direction along the length of the receiver 4. A respective thermocouple 24, 26 is located within each of the main and end blocks 16, 18 to measure the temperature for control of the heating of the preform 50.

In this embodiment, the cavity 8 has an open lower end and a closed upper end, and the preform 50 is, in use, inserted upwardly into the cavity 8 in an inverted orientation. The end body 14 includes a vacuum duct 30 extending therethrough which opens into the concave surface 15 and is connected to a conduit 32 for connection to a source of vacuum (not shown). The vacuum duct 30 and conduit 32 are provided to apply a negative pressure onto the convex outer surface 62 of the preform 50 when the preform 50 is received within the cavity 8, which acts, in use, to hold the outer surfaces 62, 68 of the preform 50 in contact with the preform-engaging surface 6 against the action of gravity.

However, as mentioned above, the vacuum facility may be omitted in any embodiment of the invention because it has been found that the swelling of the preform within the receiver cavity after heating causes the preform to be held therein even in an inverted orientation without the use of a vacuum.

In the preform heating method, the main body section 58 and closed end 60 of the preform 50 are is inserted into the cavity 8, such that the outer surfaces 62, 68 of the preform 50 engage in contact with the preform-engaging surface 6. The preform 50 may optionally be held within the cavity 8 by the vacuum applied to the closed end 60 by the duct 30. The first and second heaters 20, 22 are operated to heat the blocks 16, 18 which in turn conductively heat the receiver 4 which in turn conductively heats the preform 50.

In the heating method, the outer surface of the preform 50 is contacting with the surface of the receiver 4. The elongate annular non-cylindrical inner surface 13 having the three-dimensional relief 10 provides that the surface 13 engages in substantially non-uniform contact with the outer elongate cylindrical surface of the preform 50. Accordingly, the three-dimensional relief 100 provides contact and non-contact areas between the elongate annular inner surface 13 and the preform 50. The contact areas are provided by raised parts 110 of the three-dimensional relief 100 and the non-contact areas are provided by recessed parts 112 of the three-dimensional relief 100. In the heating step the contact areas of the preform are heated to a temperature of from 5 to 15° C. higher, optionally from 6 to 10° C. higher, than the temperature to which the non-contact areas are heated.

In the illustrated embodiment, an elliptical heating surface discontinuously contacts and conductively heats a cylindrical preform surface. In the specific embodiment, the parts of a preform to form a the major panels of a bottle having an oval cross section may be conductively heated by direct contact with the receiver surface to a higher temperature than the parts to form the opposed sides which in contrast may not be continuously directly contacted by the receiver surface. This provides that during blow moulding, the panel-forming portions of the preform stretch uniformly to provide a uniformly thin panel thickness, and the sides stretch to a reduced controlled degree so that the sides are not inadvertently over-thinned.

However, other configurations and shapes may be employed to achieve such discontinuous contact and conductive heating. For example, preform parts to form ribs or thickened bands may be non-contacted by the receiver surface and so heated to a lower temperature than the adjacent parts of the preform. Other shapes and configurations of preforms and bottles, with associated shapes and configurations of the receiver, useful to employ discontinuous contact and conductive heating will be readily apparent to those skilled in the art.

The spaced arrangement of the first and second heaters 16, 18 along the length of the receiver 4 also allows for a temperature profile to be established along the length of the receiver 4, said length being parallel with the longitudinal axis of the inserted preform, which in turn provides an accurate temperature profile along the heated preform 50. Such a temperature profile assists in achieving good stretch-blow control in the subsequent stretch blow moulding stage of the container manufacturing process.

As is known in the art, the material of the preform which is to be stretch blow moulded is heated to be within a temperature range which is above the glass transition temperature range but below the melting temperature of the thermoplastic resin. Typically, the temperature of the preform-engaging surface 6 of the receiver 4 which defines the cavity 8 is kept lower than the higher end of the thermoplastic material's blow moulding temperature range, so that the preform 50 does not inadvertently adhere to the receiver 4 and so that there is no consequential detrimental effect on the subsequent stretch-blow phase of the manufacturing process.

It will be appreciated by those skilled in the art that heating means other than the above-mentioned first and second heaters, but which still allow for a temperature profile to be established, may be employed which are within the scope of the present invention. For example, as disclosed for the second embodiment, a coil carrying heated fluid may be embedded within the blocks.

Figure 3:
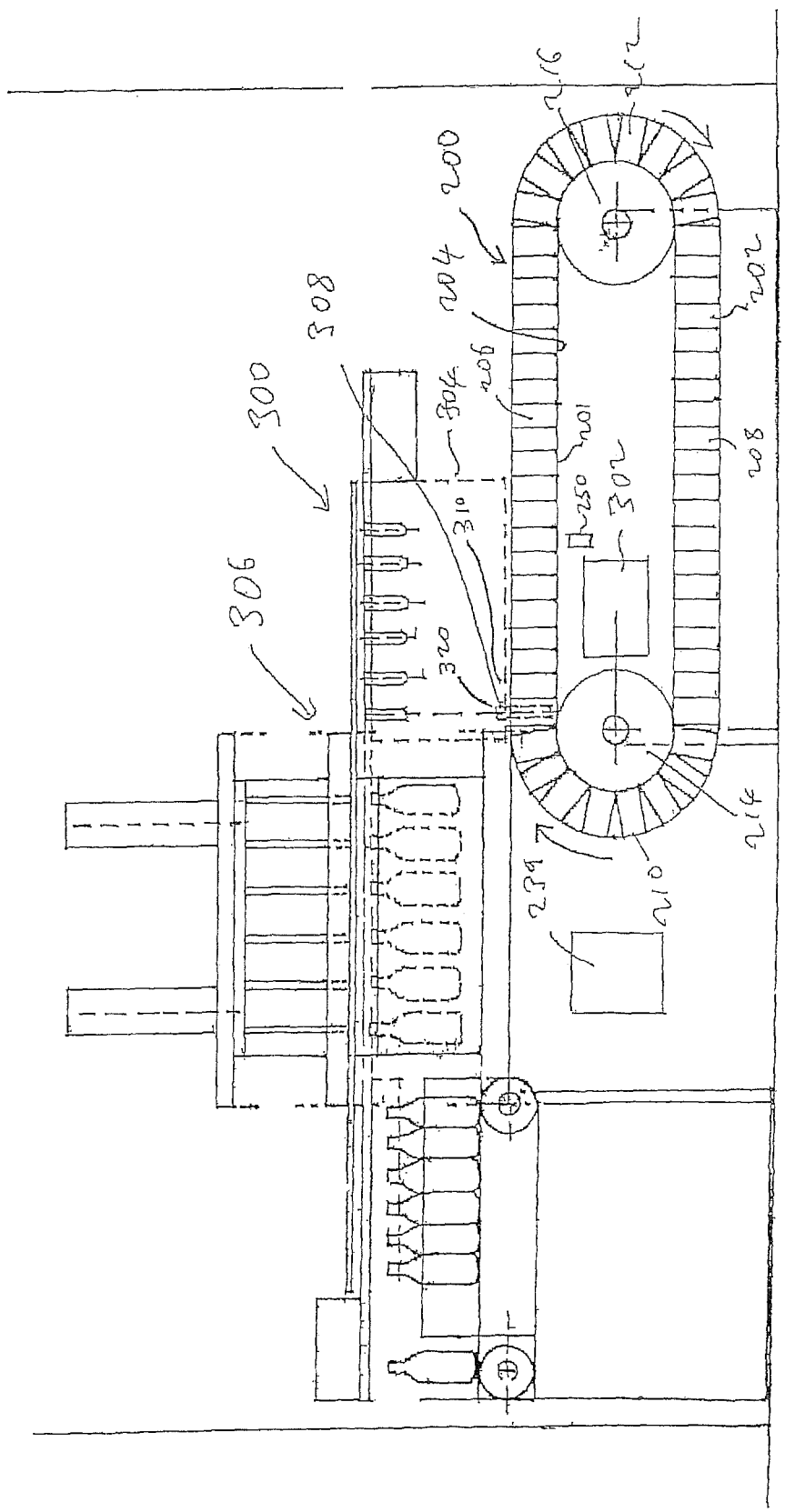
FIG. 3 shows a schematic side view of a preform reheating and conditioning apparatus in accordance with a second embodiment of the present invention coupled to a stretch blow moulding apparatus for manufacturing bottles from the preforms.
Figure 5:
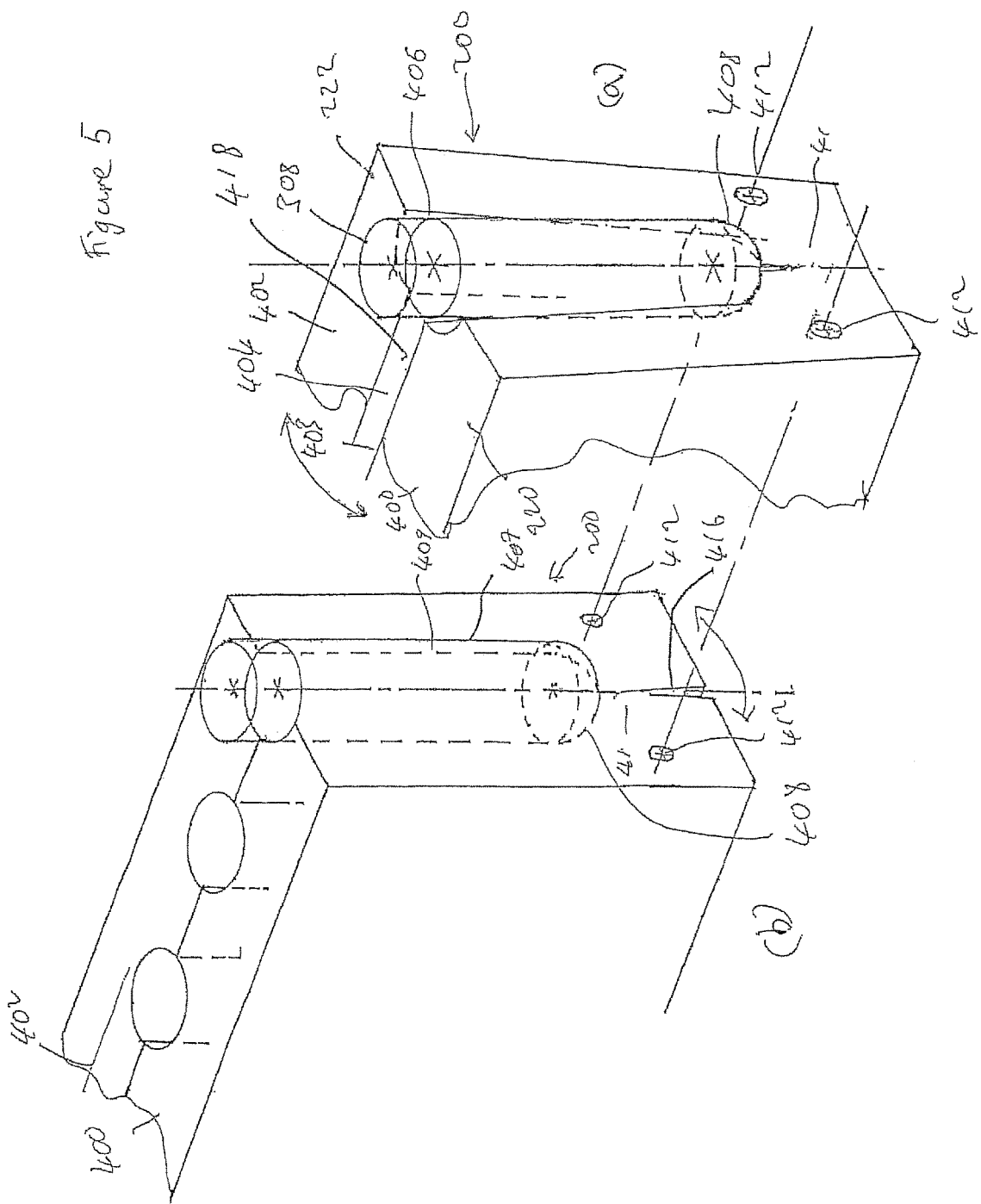

Another preferred embodiment of a receiver is illustrated in FIGS. 3 to 5. A continuous chain conveyer 200 includes a plurality of heater blocks 202 which are serially mounted around an endless loop 204 in an oval configuration. The conveyor 200 comprises a preform reheating and conditioning station. The heater blocks 202 are typically composed of a metal having high thermal conductivity, such as aluminum.

As shown in FIG. 3, the continuous chain conveyor 200 is located adjacent to a stretch blow moulding apparatus 300 for stretch blow moulding the preforms heated by the heater blocks 202 carried by the conveyor 200. The conveyor 200 is driven by an indexing motor 302 which sequentially delivers heated preforms 308 to an unloading station 304 at which the heated preforms 308 in a plurality of selected heater blocks 202 are unloaded from the heater blocks 202 and subsequently conveyed to a stretch blow moulding station 306.

An upper conveyor section 206 and a lower conveyor section 208 are provided between opposed end sections 210, 212 which are mounted on drive rollers 214, 216 which engage chain links 220 of the conveyor 200, shown in detail in FIG. 4. The conveyor 200 includes an endless chain 201 coupled to a respective end 203 of the heater block 202. Alternatively, the conveyor 200 may includes spaced endless chains, each coupled to a respective end of the heater blocks 202. Typically, sixty heater blocks 202 are mounted on the conveyor 200 in a closed loop configuration. Each heater block 202 comprises a plurality of heated cavities 218, spaced along the length of the heater block 202. Each cavity 218 is disposed between split halves 220, 222 of the block 202. The longitudinal split 224 extends between the halves 220, 222 which also extend transverse to the direction of movement of the conveyor 200.

The split halves 220, 222, when combined, define an elongate annular non-cylindrical inner surface having the three-dimensional relief as described above for the first embodiment.

Each split half 220, 222 has a radially outer electric resistance heater 226 and an associated thermocouple 228, and a radially inner electric resistance heater 230 and an associated thermocouple 232. The radially outer electric resistance heater 226 and the radially inner electric resistance heater 230 are controllable to establish a desired temperature gradient therebetween. The individual heaters 226, 230 and their respective thermocouples 228, 232 are individually controlled so as to maintain the precise temperature required for the stretch blow moulding of the preform into a bottle at the stretch blow moulding station 306. The thermocouples 228, 232 provide temperature measurement of the block regions heated by the associated heaters 226, 230. There are, in the preferred embodiment, four heaters associated with each heating block 202, comprising two radially outer heaters 226 for heating the open end (i.e. the neck finish portion) of the preform 308 and two radially inner heaters 230 for heating the closed end (i.e. the base forming portion) of the preform 308, with each of the pair of upper heaters 226 and of the pair lower heaters 230 being on a respective split half 220, 222 and therefore on opposite sides of the preform cavity 218 in the block 202. This provides uniform heating across the diameter of the preform 308, and a desired temperature gradient along the length of the preform 308.

Electrical power is supplied to the split cavities 218 via a continuous bus bar assembly. In particular, the heaters 226, 230 and thermocouples 228, 232 are electrically connected to a pick-up assembly 234 mounted at the radially inner edge of the heater block 202. The pick-up assembly 234 is slidably electrically connected to an elongate busbar feed rail 236 which extends along the conveyor path to provide electrical power and coupling to the heaters 226, 230 and thermocouples 228, 232 as the heater blocks 202 move around the endless path of the conveyor 200.

Individual thermostatic control of the heater blocks 202 is achieved using individual wireless control units 238 mounted on each pair of split halves 220, 222, each wireless control unit 238 controlling the four upper and lower heaters 226, 230 in the split halves 220, 222. A central control unit 239 wirelessly monitors the wireless control units 238. The wireless control unit 238 comprises a wireless transmitter/receiver module 238 which is connected to the pick-up assembly 234. A electrical plug connector 240 of the block 202 interfaces with an electrical socket connector 242 of the conveyor 200 which is mounted on a transversely extending stretcher support 244 which is affixed to the chain conveyor 200. The heater block 202 and the plug connector 240 affixed thereto can be unplugged from the socket connector 242 for removal from the conveyor 200 for replacement or servicing.

The control system for the heaters of the heater blocks 202 is adapted to control the heating gradient along the height of the heater block 202 to enable the temperature profile along the length of the preform 308 located in the cavity 218 to be controlled. The heating control system is adapted to provide different heating gradients dependent upon the orientation of the respective heater block 202 and the preforms 308 located therein. Since convective heat rises, in order to provide uniform heating of s selected part of a preform irrespective of the orientation of the preform 308, the temperature gradient of the heating system is modified dependent upon the orientation of the respective heater block 202.

A proximity switch 250 is mounted to the conveyor frame (not shown). The proximity switch 250 detects the position of each heater block 202 so as to provide a signal indicative of the orientation of the heater block 202. The orientation signal is communicated to the central control unit 239, which then adjusts the temperature profile of the heaters 226, 230 of the respective block 202 to ensure that the correct upper and lower temperatures are maintained.

In the event that the conveyor 200 is stopped, the central control unit 239 reduces the temperature of the heaters 226, 230 to a default setting to ensure no overheating and easy re-start of the preform heating step.

As shown in detail in FIGS. 5(a) and 5(b), the split halves 220, 222 of each heater block 202 are adapted mutually to pivot between an open position shown in FIG. 5(a) and a closed position shown in FIG. 5(b). In the open position, the upper ends 400, 402 of the split halves 220, 222 are separated and have a gap 403 therebetween to provide an enlarged upper open end 404 of the enlarged cavity 406 to permit ready insertion of a preform 308 into the cavity 406 and removal of a preform 308 from the cavity 406. In the closed position, the upper ends 400, 402 of the split halves 220, 222 are urged together into contact to provide an inner surface 407 of the cavity 406 which discontinuously contacts, as described above, the outer surface 409 of the preform 308 for high thermal coupling between the heater block 202 and the preform 308 to enable accurate and efficient heating of the preform 308.

The closed end 408 of the preform 308 is located above a pivot line 410 extending along the length of the heater block 200, and opposed pivot drive rods 412 pass through the respective split halves 220, 222 on opposite sides of the pivot line 410. The pivot drive rods 412 are actuatable selectively to drive the split halves 220, 222 between the open and closed positions by rotation about the pivot line 410 as shown by the arrows in FIG. 5.

Unheated preforms 308 are loaded at a loading station 310 into the split halves 220, 222 which are in the open position. The split halves 220, 222 are then actuated so as to be in the closed position, and the preforms 308 are reheated as they progress towards the unloading station 320. For clarity, only a preform at the unloading station 320 is illustrated. The conveyor 200 moves in a clockwise direction, as shown by the arrows in FIG. 3, passing along the top and then along the bottom of the conveyor path. The preforms 308 are conveyed along substantially the entire length of the annular path of the conveyor 200, a typical residence time being 2.5 minutes. At the unloading station 320, the split halves 220, 222 are actuated so as to be in the open position, and the heated preforms are removed. A batch of preforms 308 is removed from the line of cavities 218 extending across the split halves 220, 222 of the conveyor 200. In the embodiment shown there are six preforms 308 in the batch. The batch of preforms 308 is rotated about an angle of 90°, and then the batch is fed as a sequential line of preforms through the stretch blow moulding apparatus. Thereafter, the split halves 220, 222 return, in an indexed manner, to the loading station 310 at which a subsequent batch of preforms 308 is loaded for a subsequent reheat cycle.

Beneath the pivot line 410 the split halves 220, 222 are separable to form a longitudinal vacuum duct 416 to enable connection to a source of vacuum (not shown), located beneath the heater block 200, when the split halves 220, 222 are in the closed position of FIG. 5(b). The vacuum holds the closed end 408 of the preform 308 securely in the cavity 406 independent of the orientation of the combination of the preform 308 and the cavity 406 as the preform 308 moves circumferentially around the conveyor 200 during the preform reheating and conditioning step. The opposing faces of the split halves 220, 222 may be provided with a hermetic sealing surface 418 to assist maintaining the vacuum within the cavities 406.

As stated above, the vacuum may be omitted.

Although various embodiments of the invention have been described in detail, it will be apparent to those skilled in the art that other modifications of the apparatus and method for reheating and conditioning a preform may be employed that are within the scope of the invention as defined in the appended claims.

The invention claimed is:

1. A method for reheating and conditioning an elongate preform for forming a blow moulded container, wherein said preform is formed from a thermoplastic material and has an outer surface, the method comprising the steps of:
   i) discontinuously contacting the outer surface of the preform with a surface of a receiver, wherein the surface of the receiver includes an elongate annular non-cylindrical inner surface portion which is rotationally continuous about an elongate axis and provides a three-dimensional relief adapted to engage in substantially non-uniform contact with said outer surface of the preform, and said receiver is adapted to transfer heat conductively from said surface of the receiver to the preform; and
   ii) heating the receiver such that heat is transferred conductively from the receiver to the preform;
   wherein the three-dimensional relief provides a relief depth of 0.5 to 1.0 mm; wherein the three-dimensional relief is adapted to provide contact and non-contact areas between the elongate annular inner surface portion and the preform; and wherein the contact areas are provided by raised parts of the three-dimensional relief and the non-contact areas are provided by recessed parts of the three-dimensional relief.

2. The method according to claim 1 wherein the three-dimensional relief defines at least one longitudinally extending non-contact region extending between opposed upper and lower surface portions located radially inwardly of the longitudinally extending non-contact region.

3. The method according to claim 2 wherein the three-dimensional relief defines two opposed longitudinally extending non-contact regions extending between opposed upper and lower surface portions located radially inwardly of the longitudinally extending non-contact regions.

4. The method according to claim 3 wherein in the heating step, the contact areas of the preform are heated to a temperature of 5 to 15° C. higher than the temperature to which the non-contact areas are heated.

5. The method according to claim 1 wherein the elongate annular inner surface portion is elliptical about an elongate axis.

6. The method according to claim 5 wherein the elliptical elongate annular inner surface portion has a first major internal width which is larger than a second minor internal width.

7. The method according to claim 6 wherein the first major internal width is 1 to 3 mm larger than the second minor internal width.

8. The method according to claim 5 which is used in a process of blow moulding a bottle having an elliptical cross section.

9. The method according to claim 1 wherein the receiver further comprises a second, substantially hemispherical concave inner surface portion coupled to the elongate annular inner surface portion.

10. The method according to claim 9 wherein said surface of the receiver defines a cavity which has a closed upper end and an open lower end.

11. The method according to claim 1 wherein the receiver comprises a heater block for reheating and conditioning a preform therein and the cavity is disposed between split halves of the block, the split halves being separated by a longitudinal split extending between the halves, and the split halves of the block are movable by pivoting between an open position, at which upper ends of the split halves are separated with a gap therebetween and the preform is inserted into or removed from the receiver, and a closed position, at which the upper ends of the split halves are urged together in contact and the preform is reheated and conditioned.

12. The method according to claim 3, wherein the preform has a substantially cylindrical outer cross-section.

13. The method according to claim 4 wherein in the heating step the contact areas of the preform are heated to a temperature of from 6 to 10° C. higher than the temperature to which the non-contact areas are heated.

14. The method according to claim 7 wherein the first major internal width is from 1 to 2 mm larger than the second minor internal width.

15. The method according to claim 7 wherein the first major internal width is from 0.6 to 1.4 mm larger than the second minor internal width.

* * * * *